United States Patent Office 3,205,013
Patented Sept. 7, 1965

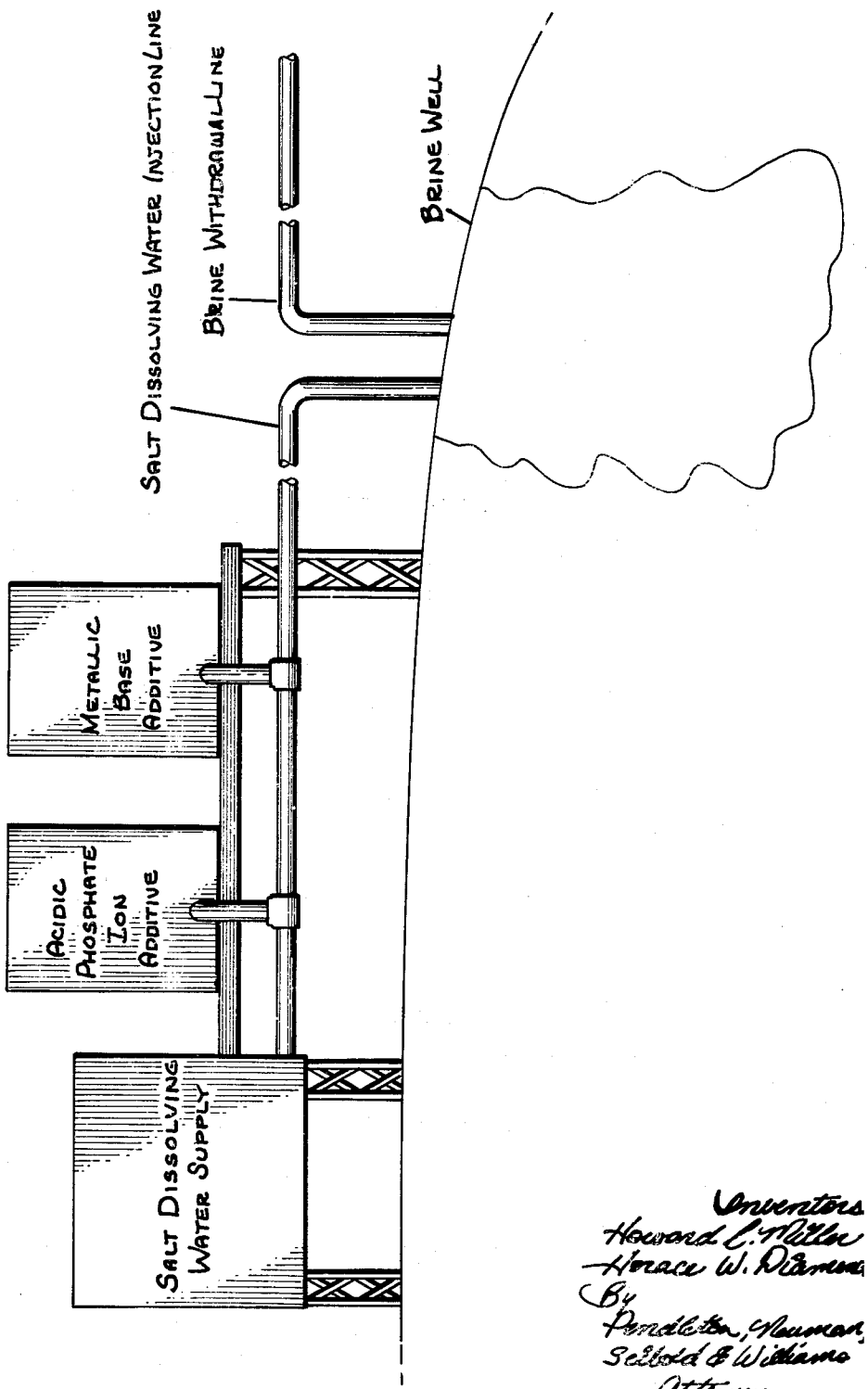

3,205,013
PREVENTION OF SCALE IN BRINE WELL
FEED LINES
Howard C. Miller, Mount Prospect, and Horace W. Diamond, Flossmoor, Ill., assignors to Morton Salt Company, Chicago, Ill., a corporation of Illinois
Filed Mar. 9, 1962, Ser. No. 178,569
8 Claims. (Cl. 299—5)

This invention relates to an improved method for producing brine. It relates more particularly to the production of sodium chloride brine which is low in calcium and sulfate content from rock salt which contains in admixture therewith calcium sulfate.

There are a number of industrial processes where sodium chloride brine having a low sulfate and/or low calcium concentration is a desideratum as in the production of chlorine and caustic soda, in the dyeing art, and in the production of metallic sodium, to mention a few. Conventionally in the production of such purified brines, the practice has been to proceed either by dissolving rock salt in a salt dissolver, of which a number of types are commercially available, or pumping water down into the cavity of a brine well, removing, the resulting brine from the brine well (or from the salt dissolver) and then adding a reagent or reagents of one kind or another to that brine so as to precipitate the undesirable components therein. Thus, calcium has been removed from brine by adding sodium carbonate thereto in order to precipitate the calcium as calcium carbonate; magnesium and sulfate radicals have been removed from solution by precipitating them through the addition of alkali metal hydroxides and soluble barium salts, respectively.

These prior art techniques, however, are not entirely satisfactory since such procedures require the removal of calcium sulfate by precipitation, generally a costly and sometimes a difficult operation.

An improvement over the aforesaid well-known prior art techniques for producing purified brine is that procedure which is described and covered by U.S. Patent No. 2,433,601 to Comstock, and which is probably the best of the known methods, up to the present time, for the preparation of purified brine; in accordance with the method of that patent, either metal orthophosphates or carbonates are added to the salt or to the water before the salt and water are mixed in a salt dissolver, and the resulting brine quickly removed from the dissolver, the treatment resulting in inhibiting solution of calcium sulfate in the resulting brine.

While metal orthophosphates such as alkali metal orthophosphates afford excellent results in maintaining the calcium and sulfate content of the brine at low values, considerable difficulty is often encountered in the use of orthophosphate compounds. In forming salt brine it is generally necessary to use available water. This dissolving water may be of varying degrees of hardness and may contain appreciable amounts of ions such as calcium and bicarbonates. When the metal orthophosphates are added to the dissolving water under the alkaline conditions necessary for dissolving the crude rock salt, the calcium which is generally present in the hard dissolving water reacts with the orthophosphate compounds to form calcium orthophosphate, which forms a deposit or scale on the water injection lines. Similarly the addition of caustic to this water will result in the formation of a calcium carbonate scale. Build-up of this calcium orthophosphate and calcium carbonate scale over a period of time can be sufficiently great as to clog the pipe lines or completely shut off fluid flow through the water injection pipe lines. Such occurrences which necessitates interruption of the brine operation so that the scale can be removed from the lines or which in some cases necessitate replacement of the pipe lines add considerably to the cost of the brine operation and are to be avoided if possible. Deposition of scale within water injection lines is particularly undesirable in the case of brine wells drilled into underground rock salt deposits which seldom are conveniently located with respect to a suitable source of water. This, of course, usually necessitates that the dissolving water be transported through pipe lines over a considerable distance and then finally injected through a line which penetrates and extends deep into the earth formation. Scaling of the line within the well is also particularly undesirable.

The present invention which is an improvement on the teaching of the aforesaid Comstock patent is directed to eliminating the disadvantages normally attending the use of metal orthophosphates in brine operations. The present invention is particularly advantageous for use in brine well operations in which dissolving water is pumped through pipe lines and injected considerable distances into the cavity of a brine well with concomitant removal of the resulting brine.

In accordance with the present invention an acidic compound capable of supplying in water solution the phosphate ion $(PO_4)^{---}$ is injected at intervals into a stream of water being transported to the crude rock salt dissolving area. A metallic base is also introduced at regular intervals into the dissolving water in such manner as to commingle with and react with the acidic phosphate ion containing reagent at the salt dissolving site to form an inhibitor which effectively suppresses dissolution of calcium sulfate in the brine while avoiding deposition of scale in the injection lines.

The figure illustrates diagrammatically the process of the present invention and shows a brine well having in communication therewith a salt dissolving water injection line and a line for removing brine from the well. As shown, the acidic phosphate ion additive and the metallic base additive are metered into the water injection line separately and intermittently at any desired location.

In one specific embodiment of the invention orthophosphoric acid or other acidic source of phosphate ion $(PO_4)^{---}$ is periodically injected into the water being transported to the salt dissolving area. The acidic source of phosphate ion can be any material capable of supplying phosphate ion in water solution and capable of reacting with the base at the salt dissolving site. Thus, acidic compounds such as sodium acid phosphate, potassium acid phosphate and the like can be used. However, orthophosphoric acid is preferred because of its general availability. The orthophosphoric acid is employed in amounts ranging from about 2 to 25 parts per million of dissolving water. As indicated, a metallic base such as sodium hydroxide is also periodically added to the water employed to dissolve the salt. The metallic base is employed in amounts sufficient to provide a pH of at least about 7 in the dissolving water.

The metallic base and the acidic phosphate ion source are added separately to the dissolving water and travel through the water injection lines is substantially concentrated distinct slugs. The acidic phosphate ion source material travels through the water injection line at a pH at which calcium phosphate and calcium carbonate are soluble. This effectively prevents build up of scale within the lines and removes carbonate scale resulting from caustic addition. The dissolving water is pumped into contact with the crude rock salt at sufficient flow rates to carry the additives to the salt dissolving site in essentially distinct slugs. Generally flow rates of from about 0.5 to about 5 feet per second are suitable in this respect. As slugs of orthophosphoric acid and sodium hydroxide discharge from the end of the water injection line within the salt cavity, thorough mixing between the two occurs resulting in the formation of the sodium orthophosphate salt which functions as the active calcium precipitating agent whereby dissolution of calcium sulfate in the brine is minimized.

The interval of time lapsing between addition of the orthophosphoric acid and metallic base to the dissolving water can be varied widely and is dependent on size of cavity. From a convenience standpoint it is generally preferable to extend the time interval between addition of the additives. We have found that in a cavity in which $\frac{1}{250}$ of the solution in the cavity is replaced each day the orthophosphoric acid and metallic base can be conveniently added to the salt dissolving water at intervals of 24 hours with satisfactory results. With the dissolving water being injected continuously at a rate of about 150 gallons per minute the addition of about 37.5 pounds of orthophosphoric acid (75% anhydrous acid) and about 75 pounds of sodium hydroxide (50%) every 24 hours affords a phosphoric acid concentration in the water of about 15 parts per million and caustic concentration of about 25 parts per million. Shorter intervals of time between additions of the orthophosphoric acid and metallic base can, of course, be employed with the periods between addition of these materials ranging from several minutes up to 24 hours.

It is also generally desirable to allow a short interval of time between the addition of the acidic material and the base to the water to insure that the two additives do not react in the pipe lines. This interval of time between addition of each of the additives can range from a few seconds up to several minutes or more, a 10 minute period being generally satisfactory.

When natural waters having a high calcium bicarbonate alkalinity are employed to dissolve the salt, it is preferred to add a small amount of the acidic phosphate ion source material along with the metallic base. This effectively prevents a base such as sodium hydroxide from reacting with the bicarbonate in the water to form sodium carbonate which in turn reacts with calcium to precipitate calcium carbonate scale. Minor amounts of the total amount of the acidic phosphate ion source material can be added with the base for this purpose. A suitable amount is about 2 parts per million of the acidic material per million parts of the water.

The bases which are employed in the present invention are preferably strong bases which are employed in amounts sufficient to bring the pH of the resulting water after commingling with the acid to 7 or above. The pH of the water during the dissolving operation is of importance. The content of calcium compounds, including calcium sulfate, in the brine increases rapidly as the pH of the water drops below 7. Thus, the addition of an alkaline material such as sodium hydroxide to water having a low pH value to bring its pH up to at least 7 prior to dissolving the crude salt materially reduces the content of calcium radical and sulfate radical in the resulting brine.

Thus, strong bases such as the hydroxides and carbonates of the alkali metals sodium, potassium and lithium are preferred. The bases are employed in amounts in excess of that required for reaction with the acidic $(PO_4)^{---}$ ion containing compound so as to bring the pH of the water to at least about 7. Generally, the base is employed in the water in amounts ranging from about 20 parts per million to about 200 parts per million of dissolving water.

The invention is further illustrated by the following details of brine forming operations carried out on brine wells in the State of Louisiana. The data presented below was obtained by frequently comparing the hardness of composite samples of the salt dissolving water before treatment at the point of its introduction into the water injection lines with its hardness after being transported for approximately one mile through a 6 inch diameter water injection line to the brine wells. Throughout the test the dissolving water flow rate was maintained at approximately 150 gallons per minute. The amount of scale deposition on the water injection lines was calculated from the water analyses data based on a flow rate of 150 gallons per minute. The operating conditions and results are tabulated in Table I.

*Table I*

| Test | Treatment of Water at the Point of Introduction of the Water into the Injection Line | pH of Water | Calculated Pounds of $CaCO_3$ Hardness Scale Deposited in Water Injection Line in 24 hours |
|---|---|---|---|
| 1 | None | 9.0 | None. |
| 2 | 25 p.p.m. NaOH and 15 p.p.m. $H_3PO_4$ added together Continuously. | 9.7 | 49. |
| 3 | 25 p.p.m. NaOH and 1 p.p.m. $H_3PO_4$ added together Continuously. | 10.1 | 32. |
| 4 | Slug treatment in which all the phosphoric acid required for 24 hrs. was added at one time followed by the addition at once of all sodium hydroxide required per day: (1) 3 gallons of 75% $H_3PO_4$ added to water at plant in 5 min. (Equiv. to 15 p.p.m. $H_3PO_4$/24 hrs.) Scale dissolved—3.0 lbs. $CaCO_3$. (2) 6 gallons of 50% NaOH added to well water at plant in 5 minutes (Equiv. to 25 p.p.m. NaOH per 24 hrs.) Scale deposited—3.7 lbs. $CaCO_3$. | | 0.7 net. |

As seen from the above results, the amount of scale deposited in the above Test No. 4 which is the method of the present invention, was negligible. The slug treatment method of the present invention as described in Test No. 4 was continued for approximately two weeks without any appreciable effect on the purity of the brine produced, a high purity brine being consistently obtained. Moreover, inspection of the water injection line at the location of the brine well showed that a thick deposit of scale which was present therein at the start of the slug treatment method of operation had been removed.

Those modifications and equivalents which fall within the spirit of the invention and the scope of the appended claims are to be considered part of the invention.

We claim:

1. In the method of preparing a sodium chloride brine low in calcium sulfate content from solid sodium chloride which is contaminated by calcium sulfate in a well having in communication therewith a water injection line wherein the solid sodium chloride is contacted with a stream of water introduced through said water injection line so as to dissolve the sodium chloride and form a brine solution which is recovered, the improvement which consists in intermittently adding to said water stream in said water injection line a metallic base in an amount sufficient to provide a pH in the water of at least about 7 and intermittently but separately from said metallic base adding to said water stream in said water injection line an acidic phosphate ion containing compound reactable with said base to form the corresponding metal orthophosphate.

2. The process of claim 1 wherein said base and said acidic phosphate ion containing compound are added to the water stream at intervals of more than one hour and wherein there is an interval of more than one minute between the addition of the additives.

3. The process of claim 1 wherein the base and phosphate ion containing compound are added to the water at intervals of approximately 24 hours and where there is an interval of about ten minutes between the addition of the two additives.

4. The process of claim 1 where the base is employed in an amount ranging from about 20 to 200 parts per million of dissolving water and the acidic phosphate ion containing compound is employed in an amount ranging from about 2 to 50 parts per million of dissolving water.

5. The process of claim 1 wherein the base employed is sodium hydroxide and the acidic phosphate ion compound is orthophosphoric acid.

6. The process of claim 5 wherein sodium hydroxide and orthophosphoric acid are added to the water at intervals of about 24 hours and wherein there is an interval of about ten minutes between the addition of sodium hydroxide and orthophosphoric acid.

7. The process of claim 5 wherein sodium hydroxide is employed in an amount ranging from about 20 to 200 parts per million of dissolving water and the orthophosphoric acid is employed in an amount ranging from about 2 to 25 parts per million of dissolving water.

8. The process of claim 7 wherein a portion of the orthophosphoric acid is added with the sodium hydroxide.

References Cited by the Examiner

UNITED STATES PATENTS

| | | | |
|---|---|---|---|
| 1,956,515 | 4/34 | Hall | 210—57 |
| 2,085,828 | 7/37 | Rice | 210—57 |
| 2,204,522 | 6/40 | Werner | 210—57 |
| 2,326,950 | 8/43 | Kepfer | 210—47 X |
| 2,433,601 | 12/47 | Comstock | 23—42 X |

NORMAN YUDKOFF, *Primary Examiner.*